(12) United States Patent
Ronquillo Melendez et al.

(10) Patent No.: US 10,035,466 B2
(45) Date of Patent: Jul. 31, 2018

(54) APPARATUS WITH INTEGRAL CLIP FOR TAGS, TICKETS AND THE LIKE

(71) Applicant: FORD GLOBAL TECHNOLOGIES, LLC, Dearborn, MI (US)

(72) Inventors: Francisco Ronquillo Melendez, Puebla (MX); Enrique Granell Peniche, Naucalpan De Juarez (MX); Antonio Martinez Ilescas, San Mateo Atenco (MX); Marco Antonio Araujo Padilla, Mexico (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/209,406

(22) Filed: Jul. 13, 2016

(65) Prior Publication Data

US 2018/0015884 A1    Jan. 18, 2018

(51) Int. Cl.
    *B60R 7/08* (2006.01)
    *B60R 13/02* (2006.01)

(52) U.S. Cl.
    CPC .............. *B60R 7/08* (2013.01); *B60R 13/025* (2013.01); *B60R 13/0206* (2013.01)

(58) Field of Classification Search
    CPC ...... B60R 7/08; B60R 13/0206; B60R 13/025
    USPC ................ 296/1.08, 193.06, 37.13
    See application file for complete search history.

(56) References Cited

U.S. PATENT DOCUMENTS

| | | | |
|---|---|---|---|
| 3,851,505 A | 12/1974 | Wilkinson | |
| 9,604,578 B2 * | 3/2017 | Parlow | B60R 7/04 |
| 2008/0169667 A1 * | 7/2008 | Siniarski | B60N 3/002 |
| | | | 296/37.8 |
| 2009/0250911 A1 * | 10/2009 | Sia, Jr. | B60R 13/025 |
| | | | 280/728.3 |
| 2011/0154705 A1 | 6/2011 | Gardiner | |
| 2011/0309649 A1 * | 12/2011 | Yamase | B60R 13/0853 |
| | | | 296/57.1 |

FOREIGN PATENT DOCUMENTS

| | | |
|---|---|---|
| DE | 19654698 A1 | 7/1997 |
| DE | 19722502 A1 | 12/1997 |
| DE | 19727007 B4 | 4/2010 |
| JP | 11348669 A | 12/1999 |
| JP | 3064270 U | 1/2000 |
| JP | 2014046740 A | 3/2014 |
| KR | 2003024988 A * | 3/2003 |
| KR | 101251824 B1 * | 4/2013 |
| KR | 2013003958 U * | 7/2013 |

(Continued)

OTHER PUBLICATIONS

English Machine Translation of DE19654698A1.

(Continued)

*Primary Examiner* — Hilary L Gutman
(74) *Attorney, Agent, or Firm* — Vichit Chea; King & Schickli, PLLC

(57) ABSTRACT

An apparatus, a pillar trim panel and an A-pillar trim panel include an integral body having a lug and a margin outlining the lug. The margin and the lug extend in two different planes so as to define a slot. A spring clip is carried on the body behind the lug. A ticket, tag or the like may be inserted through the slot into the spring clip which defines a resilient object holder.

10 Claims, 3 Drawing Sheets

(56) References Cited

FOREIGN PATENT DOCUMENTS

| | | | |
|---|---|---|---|
| KR | 469362 | Y1 | 10/2013 |
| KR | 200469362 | Y1 * | 10/2013 |
| WO | 1999006240 | A1 | 2/1999 |

OTHER PUBLICATIONS

English Machine Translation of DE19722502A1.
English Machine Translation of DE19727007B4.
English Machine Translation of JP11348669A.
English Machine Translation of JP2014046740A.
English Machine Translation of JP3064270U.
English Machine Translation of WO1999006240A1.

* cited by examiner

APPARATUS WITH INTEGRAL CLIP FOR TAGS, TICKETS AND THE LIKE

TECHNICAL FIELD

This document relates generally to the motor vehicle equipment field and, more particularly, to an apparatus, such as a pillar trim panel, incorporating an integral lug and a spring clip carried behind the lug so as to provide a holder for tags, tickets and other papers.

BACKGROUND

Many people today live in gated communities or work at high security facilities requiring the display of parking tickets, tags, and/or associated papers on their cars so that the authorities, such as security guards, or electronic sensors may quickly and easily confirm the authority of the vehicle operator to enter the building or parking area.

This document relates to a new and improved apparatus, which may take the form of a pillar trim panel, that incorporates an integral lug and associated spring clip to hold parking tickets, residential ID tags and the like in a necessary position to allow their easy viewing by security guards or sensors. Advantageously, the integral holder prevents the tags, tickets or the like from being displaced by movements of the motor vehicle or wind currents generated by open windows when the motor vehicle is operated at speed. Further, the tag, ticket or the like is maintained at a position where it may be easily viewed by a security guard or scanned by a sensor at a location that does not compromise the driver's sight lines for operating the motor vehicle in an effective manner.

SUMMARY

In accordance with the purposes and benefits described herein, an apparatus is provided. That apparatus comprises a body including an integral lug and a spring clip carried behind the lug.

The body of the apparatus may include a margin outlining the integral lug. That margin may extend in a first plane and the integral lug may extend in a second plane whereby a slot is defined between the margin and the integral lug.

Further, the spring clip defines a resilient object holder. The mouth of that resilient object holder may be positioned between the first plane and the second plane and accessed through the slot defined between the lug and the margin.

In accordance with another aspect, a pillar trim panel is provided for a motor vehicle. That pillar trim panel comprises an integral body including a lug and a margin outlining the lug. Further, the pillar trim panel includes a spring clip carried on the integral body behind the lug. The margin may extend in a first plane and the lug may extend in a second plane whereby a slot is defined between the margin and the lug. As with the apparatus mentioned above, the spring clip defines a resilient object holder. That resilient object holder has a mouth oriented toward the slot defined between the margin and the lug. Further, the mouth of the resilient object holder may be positioned between the first plane and the second plane so as to be accessed through that slot.

Still further, an A-pillar trim panel is provided. That A-pillar trim panel comprises an integral body including a lug and a margin outlining the lug. The lug and the margin are oriented motor vehicle forward toward a windshield of a motor vehicle. Further, a spring clip is carried on the integral body behind the lug.

As noted above with respect to the apparatus and the pillar trim panel, the A-pillar trim panel may further include a margin that extends in a first plane and a lug that extends in a second plane whereby a slot is defined between the margin and the lug. Further, the spring clip defines a resilient object holder. That resilient object holder may have a mouth oriented toward the slot defined between the margin and the lug. Thus, the mouth of the resilient object holder may be positioned between the first plane and the second plane so as to allow one to insert a tag, ticket, paper, other document or the like into the resilient object holder.

In the following description, there are shown and described several preferred embodiments of the apparatus, the pillar trim panel and the A-pillar trim panel. As it should be realized, the apparatus and the pillar trim panels are capable of other, different embodiments and their several details are capable of modification in various, obvious aspects all without departing from the apparatus and pillar trim panels as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and the pillar trim panels and together with the description serves to explain certain principles thereof. In the drawing figures.

Reference will now be made in detail to the present preferred embodiments of the apparatus, the trim panel and the A-pillar trim panel, examples of which are illustrated in the accompanying drawing figures.

DETAILED DESCRIPTION

Figure 1:
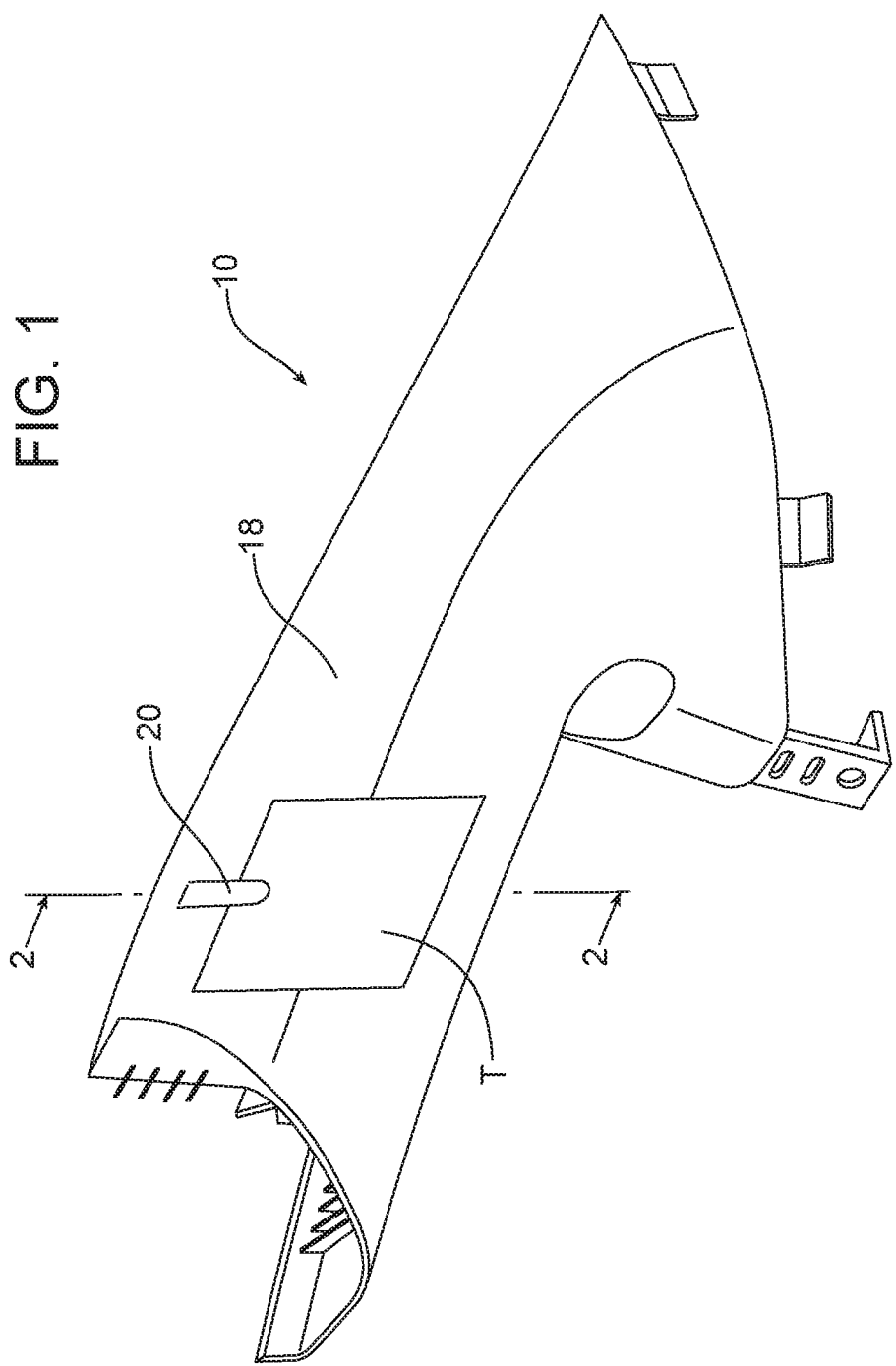
FIG. 1 is a detailed perspective view of an A-pillar trim panel incorporating an integral lug and a spring clip carried on the trim panel behind the lug.
Figure 2:
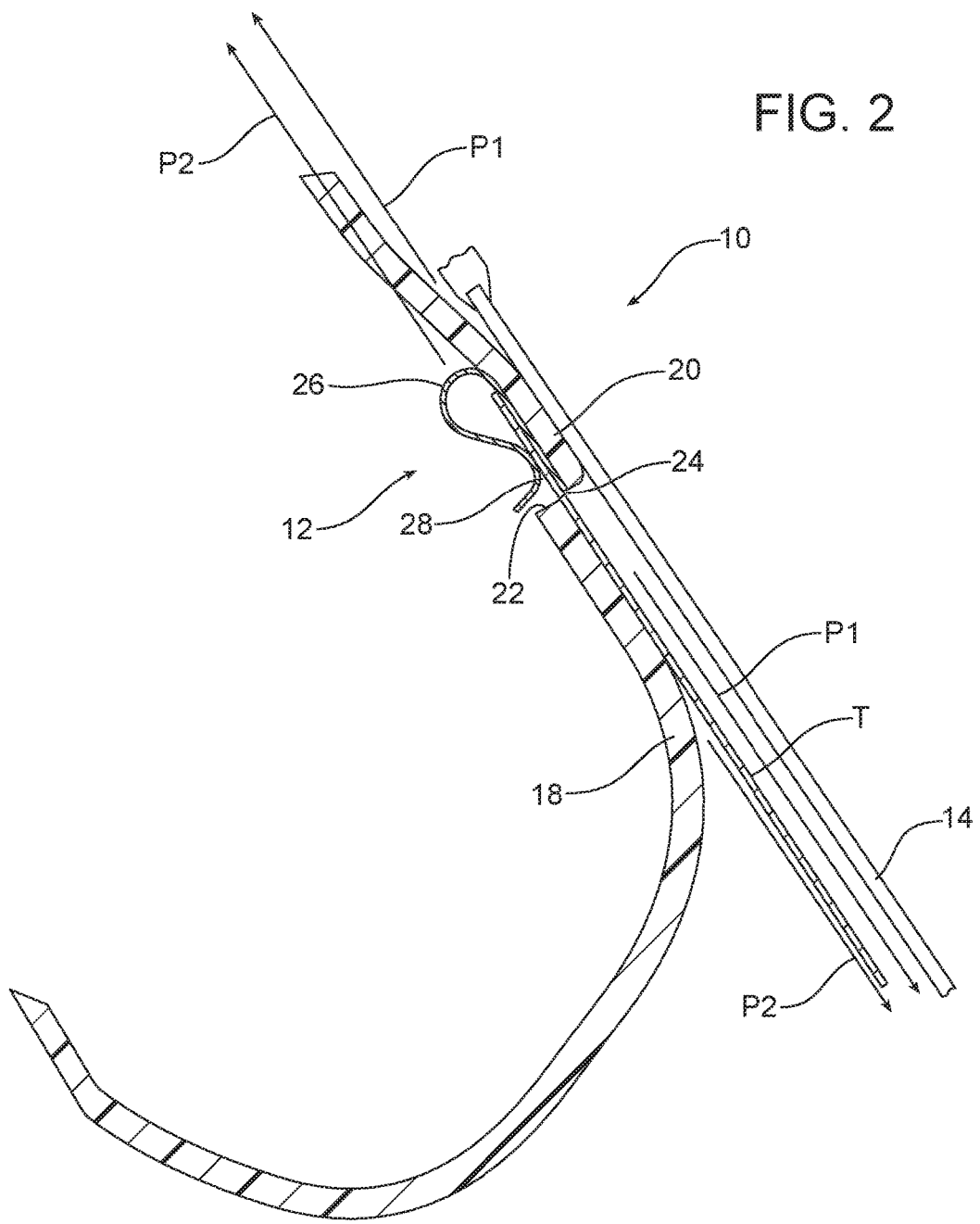
FIG. 2 is a cross-sectional view of the A-pillar trim panel illustrated in FIG. 1 along line 2-2 of the FIG. 1.
Figure 3:
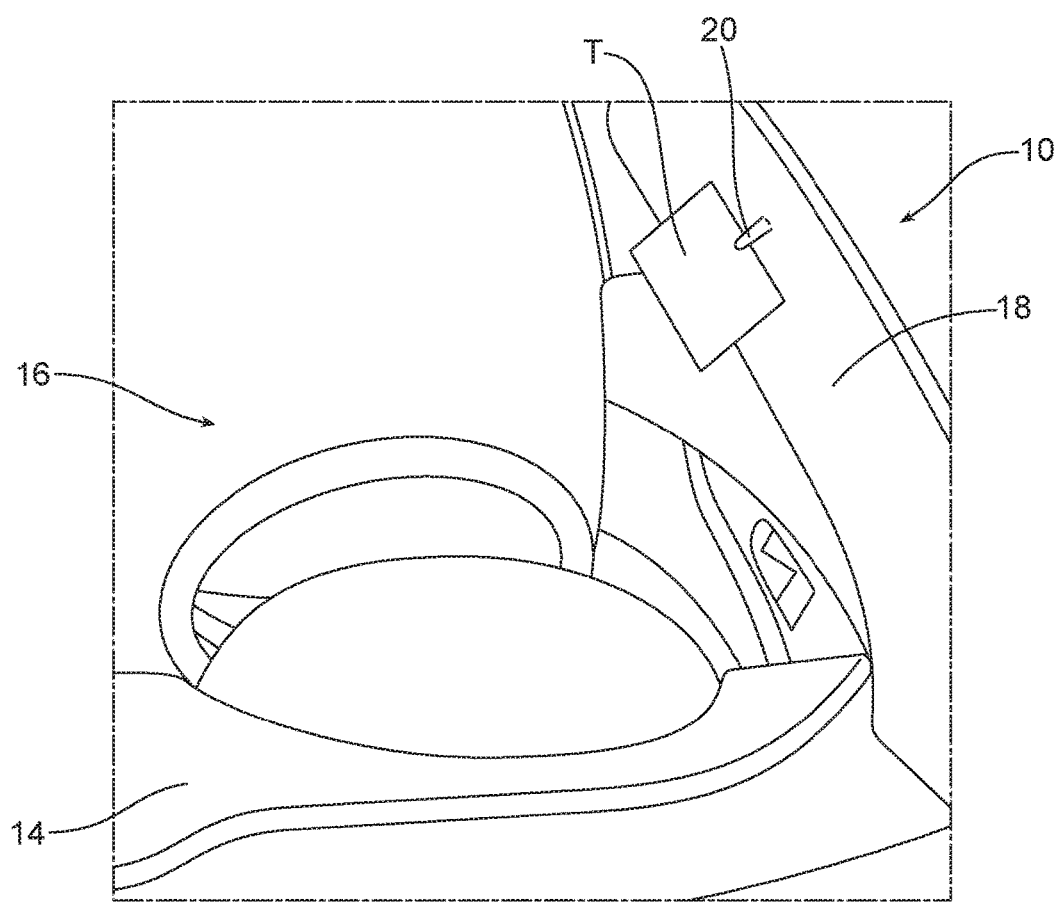
FIG. 3 is a front perspective view of part of a motor vehicle equipped with the A-pillar trim panel illustrated in FIGS. 1 and 2.

Reference is now made to FIGS. 1-3 illustrating an apparatus 10, in the form of an A-pillar trim panel, that incorporates an integral resilient object holder 12 that is uniquely adapted to hold parking tickets, residential ID tags, other papers, documents or the like T in a position against the windshield 14 of a motor vehicle 16 at a specified location. That location allows those tickets, tags and the like T to be easily viewed through the windshield 14 by security personnel or easily scanned by security scanning equipment or sensors. Advantageously, the resilient object holder 14 maintains the tickets, tags and the like T in proper orientation and position for viewing and scanning, preventing the tickets, tags and the like from shifting around during motor vehicle operation or being blown around by wind currents when the windows of the motor vehicle are open. Further, the resilient object holder 14 functions to hold those objects where they do not compromise the visibility and sight lines of the motor vehicle operator. In addition, the integral nature of the resilient object holder 14 ensures its availability for use at all times while also providing an aesthetically pleasing appearance.

As best illustrated in FIGS. 1 and 2, the apparatus 10 includes an integral body 18 having a lug 20 and a margin 22 outlining the lug. As best illustrated in FIG. 2, the lug 20 extends in a first plane P1 while the margin 22 extends in a second plane P2. A slot 24 is defined between the lug 20 and the margin 22.

As shown in FIG. 2, a spring clip 26 is carried on the integral body 18 behind the lug 20. The spring clip 26 may be attached to the integral body 18 by rivets, fasteners or any appropriate structure (not shown). The spring clip 26 may be made from a resilient metal and is shaped to define the mouth 28 of the resilient object holder 12. Thus, as illustrated in FIG. 2, the mouth 28 of the resilient object holder is oriented toward the slot 24 defined between the margin 22 and the lug 20. Further, the mouth 28 of the resilient object holder 12 is positioned between the first plane P1 and the second plane P2.

As best illustrated in FIG. 3, the integral body 18 of the apparatus is positioned on the motor vehicle 16 so that the lug 20 and margin 22 are oriented motor vehicle forward toward the windshield 14. As a result of the geometry of the mouth 28 and the slot 24, one may easily insert a ticket, tag or the like T into the resilient object holder 12. This is done by sliding the ticket, tag or the like T along the windshield 14 until the edge of the ticket, tag or the like slides through the slot 24 between the lug 20 and the margin 22 and then passes through the mouth 28 into the resilient object holder 12 formed by the spring clip 26. The resilient nature of the spring clip 26 grasps the ticket, tag or the like T so inserted and holds the ticket, tag or the like in the desired position.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus, comprising:
    a body including an integral lug and a margin outlining said integral lug, wherein said margin extends in a first plane and said integral lug extends in a second plane whereby a slot is defined between said margin and said integral lug; and
    a resilient metal spring clip carried on said body behind said lug.

2. The apparatus of claim 1, wherein said spring clip defines a resilient object holder.

3. The apparatus of claim 2, wherein said resilient object holder is positioned between said first plane and said second plane.

4. A pillar trim panel for a motor vehicle, comprising:
    an integral body including a lug and a margin outlining said lug, wherein said margin extends in a first plane and said lug extends in a second plane whereby a slot is defined between said margin and said lug; and
    a spring clip attached to said integral body behind said lug.

5. The pillar trim panel of claim 4, wherein said spring clip defines a resilient object holder.

6. The pillar trim panel of claim 5, wherein said resilient object holder has a mouth oriented toward said slot defined between said margin and said lug.

7. The pillar trim panel of claim 6, wherein said mouth of said resilient object holder is positioned between said first plane and said second plane.

8. An A-pillar trim panel, comprising:
    an integral body including a lug and a margin outlining said lug, said lug and said margin being oriented toward a windshield of a motor vehicle; and
    a spring clip attached to said integral body behind said lug, said spring clip defining a resilient object holder having a mouth oriented toward a slot defined between said margin and said lug.

9. The A-pillar trim panel of claim 8, wherein said margin extends in a first plane and said lug extends in a second plane.

10. The A-pillar trim panel of claim 9, wherein said mouth of said resilient object holder is positioned between said first plane and said second plane.

\* \* \* \* \*